(12) United States Patent
Poole

(10) Patent No.: US 6,753,850 B2
(45) Date of Patent: Jun. 22, 2004

(54) LOW PROFILE CURSOR CONTROL DEVICE

(75) Inventor: David L. Poole, Portland, IN (US)

(73) Assignee: CTS Corporation, Elkhart, IN (US)

( * ) Notice: Subject to any disclaimer, the term of this patent is extended or adjusted under 35 U.S.C. 154(b) by 356 days.

(21) Appl. No.: 09/912,090

(22) Filed: Jul. 24, 2001

(65) Prior Publication Data

US 2003/0128181 A1 Jul. 10, 2003

(51) Int. Cl.[7] .............................. G09G 5/00; G09G 5/08
(52) U.S. Cl. ........................ 345/161; 345/156; 345/157; 345/160
(58) Field of Search ................................ 345/156–157, 345/160–163, 168–169

(56) References Cited

U.S. PATENT DOCUMENTS

| | | | | |
|---|---|---|---|---|
| 5,867,808 A | * | 2/1999 | Selker et al. ................. 702/41 |
| 5,872,320 A | * | 2/1999 | Kamentser et al. ..... 73/862.044 |
| 6,040,823 A | * | 3/2000 | Seffernick et al. ........... 345/168 |
| 6,195,082 B1 | * | 2/2001 | May et al. .................... 345/161 |
| 6,243,077 B1 | * | 6/2001 | Manara et al. ............... 345/157 |
| 6,359,613 B1 | * | 3/2002 | Poole .......................... 345/161 |
| 6,477,904 B2 | * | 11/2002 | Maeda et al. ........... 73/862.044 |
| 6,484,119 B1 | * | 11/2002 | Kaneo et al. ................ 702/150 |
| 6,606,084 B1 | * | 8/2003 | Slotta .......................... 345/161 |

* cited by examiner

Primary Examiner—Regina Liang
Assistant Examiner—Duc Q Dinh
(74) Attorney, Agent, or Firm—Mark P. Bourgeois

(57) ABSTRACT

A cursor control device is taught that provides a compact and easily manufactured design. A shaft or actuator surface attaches around the periphery of a substrate. The substrate carries at least one strain sensitive resistor that provides an electrical signal indicative of the stress placed on the actuator. The substrate is attached to a supporting structure at a point in general proximity to the center of the substrate.

9 Claims, 5 Drawing Sheets

US 6,753,850 B2

LOW PROFILE CURSOR CONTROL DEVICE

BACKGROUND AND SUMMARY OF THE INVENTION

Computers use various cursor control mechanisms to provide a physical control over cursor placement on the computer screen. The most common form of cursor control device is a mouse. Because a mouse is used in a position physically remote from the computer, it is not the preferred cursor control device for portable or laptop computers. In these computers, users want the freedom to operate the computer without any additional external devices. One frequently used cursor control mechanism incorporated into portable computers is that of a pointing stick. These devices have been described in many patents including U.S. Pat. No. 5,966,117 to Seffernick incorporated herein by reference. The Seffernick device provides a pointing stick mechanism including the ability for sensing a z-axis deflection. This z-axis deflection can be used to provide the mouse click function in place of providing separate buttons on the chassis of the computer.

One problem with existing pointing stick devices is the height of the device above the keyboard of the computer. When the screen is folded over the keyboard to close the computer, heavy objects can be placed on top of the computer. The screen may deflect when loaded in this manner causing the center of the screen to be impacted by the pointing stick. As the load is increased, it is possible for the deflection to cause damage to either the pointing stick or the screen.

One approach to resolve some of the problems associated with pointing stick devices has been to mount the strain sensitive resistors on a supporting member rather than the shaft of the pointing stick. However, these devices have placed the shaft connection to the underlying substrate towards the center of the device with a supporting electrical connection towards the periphery of the device. This can result in poor performance because of the distance between the connection points. The ceramic material used for the substrate typically expands and contracts in response to temperature differently than the underlying printed circuit board to which the substrate is mounted. As the temperature within the computer increases or decreases, the connections between the substrate and the printed circuit board are therefore stressed. Placing the connections as close together as possible can minimize this harmful effect. An additional problem with traditional approaches is that as keys are pressed on the keyboard or as the computer is flexed slightly, the support for the pointing stick is correspondingly flexed. This can cause unwanted cursor movement. Placing the physical connections towards the center of the substrate similarly minimizes this effect.

The present invention overcomes this problem by providing a pointing device that is compact in design. The present invention is also easily manufactured and the structure is simplified over other compact pointing devices.

The present invention is directed to a pointing stick especially for use as a cursor control device for a computer that incorporates strain sensitive resistors. The pointing stick includes a shaft mounted to a substrate around the periphery of the substrate. The substrate is fixedly attached to a printed circuit board or other structure. The substrate carries at least one strain sensitive resistor. As the shaft is deflected, the substrate is stressed relative to its attachment to the printed circuit board which in turn causes the strain sensitive resistor to vary resistance to correspond to the desired cursor movement by the user.

It should be noted that the drawings are not to scale.

DETAILED DESCRIPTION

Figure 1:
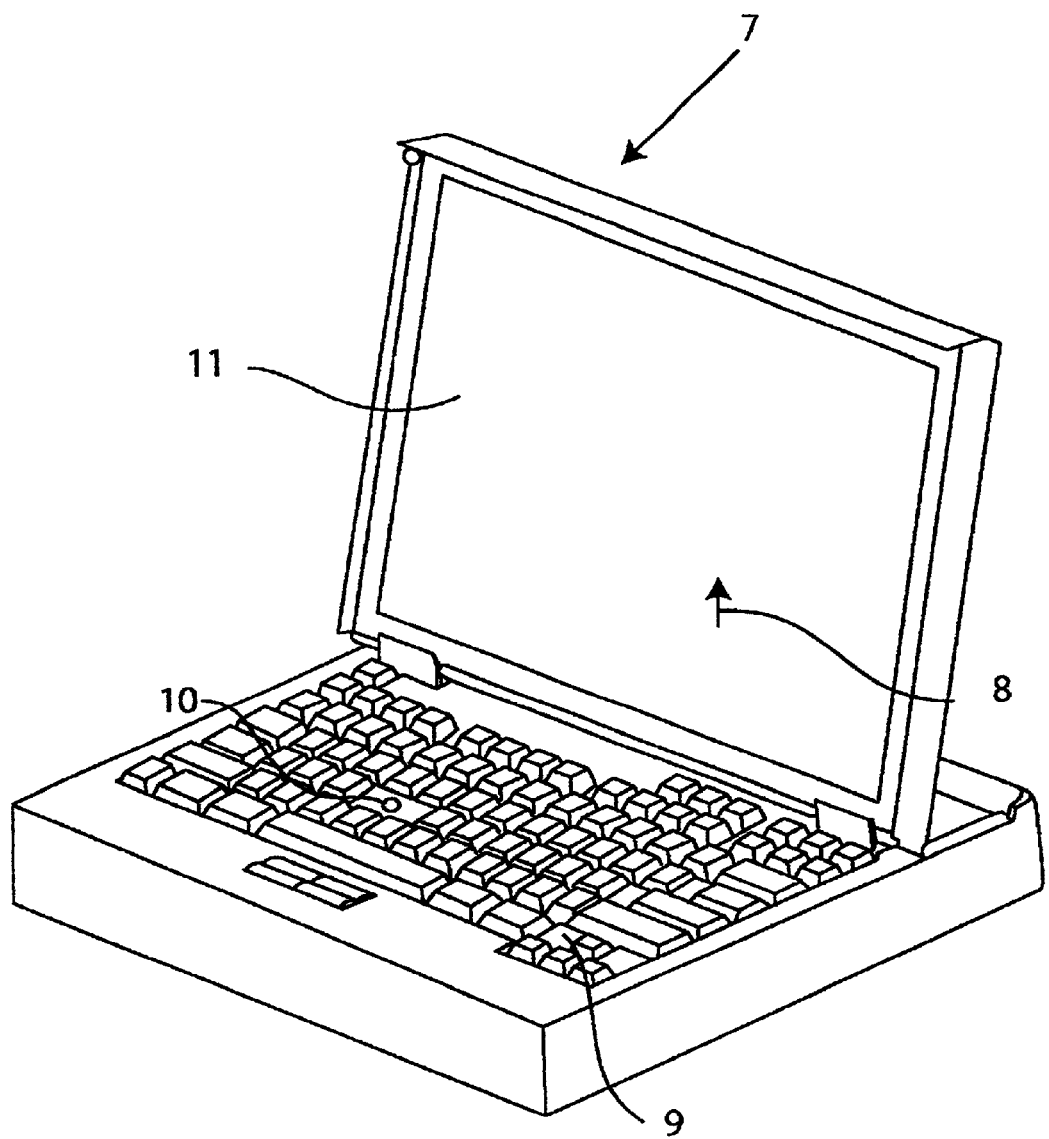
FIG. 1 shows a computer device incorporating the present invention.

Computers typically are controlled by users through the use of various input control devices including a cursor control and keyboard. Computer 7 typically has a program running thereon that provides for movement of a cursor 8 on display device 11 in response to the user operating cursor control device such as a pointing stick 10. One such program is Microsoft Windows ME. Display device 11 can be any of a number of different devices, such as an LCD attached to a laptop computer; other similar devices such as a computer monitor employing a cathode ray tube (CRT) may also be used. Computer 7 as shown in FIG. 1 is a laptop computer, although the invention is not limited to any particular configuration. For example, computer 7 may also be a desktop or tower system. As shown in FIG. 1, pointing stick 10 is mounted between the "g" "h" and "b" keys on a standard "QWERTY" laptop keyboard 9. The term "QWERTY" is a common term used to describe the layout of the keyboard based upon the first six letters across the top row of keys.

Pointing stick 10 allows a computer user to move the cursor 8 on display device 11. Pointing stick 10 therefore translates movement by the user into an electronic signal provided to the computer via a communications link which is internal to the computer 7 of FIG. 1. Not shown is that computer 7 typically includes a central-processing unit (CPU), a random-access memory (RAM), and a read-only memory (ROM). The CPU, RAM, and ROM may be of any type; the invention is not particularly limited. In one embodiment, the CPU is an Intel Pentium IV processor, there are sixty-four megabytes of RAM, and the ROM contains such functionality as a basic input/output system (BIOS). Also not shown is that computer 7 usually comprises a fixed storage device such as a hard disk drive with software resident thereon, and a removable storage device such as a floppy disk drive.

Figure 2:
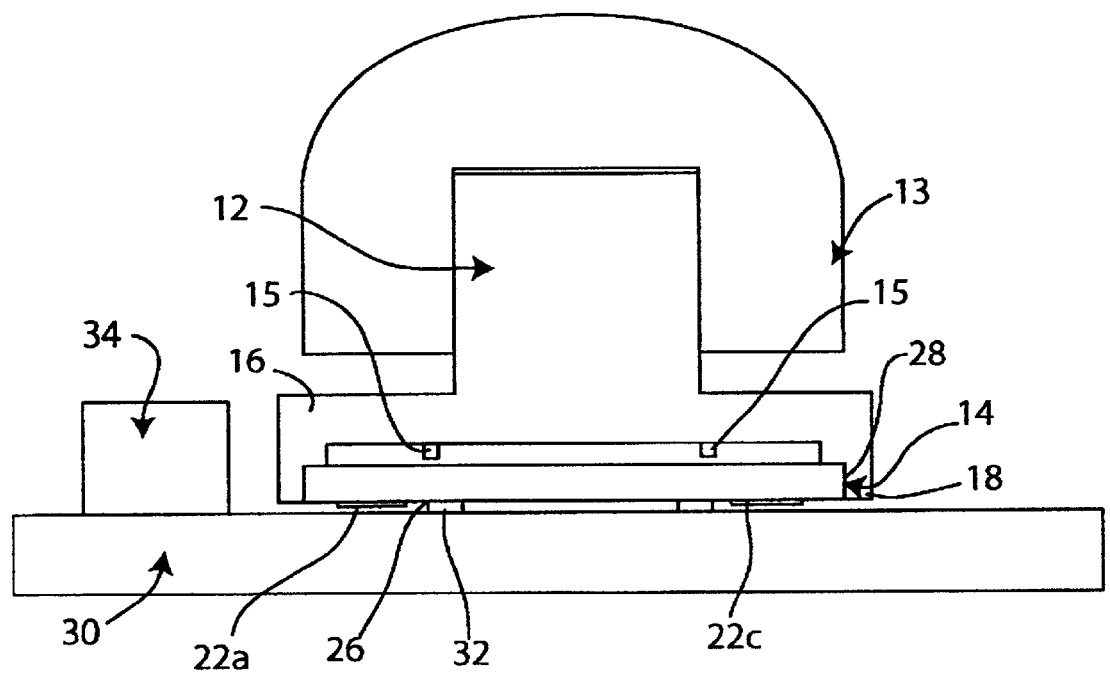
FIG. 2 shows a pointing stick according to the present invention.

Referring to FIG. 2, pointing stick 10 according to the present invention is shown. In particular, the pointing stick 10 is made up of an actuator 12, a substrate 14 for supporting the actuator 12 and a structural support 30 such as a printed circuit board. Actuator 12 is preferably generally circular in cross-section, but can be any shape desired based upon space available and other physical constraints. A rubber actuator 13 is placed over the top of the actuator 12. The rubber cap 13 provides a better surface texture for the user to contact. The actuator 12 includes a base portion 16 which is dimensionally larger than the actuator 12. The base 16 includes a peripheral flange 18 which extends downward from the base 16. The actuator 12 also includes overlimit protectors 15.

Figure 3:
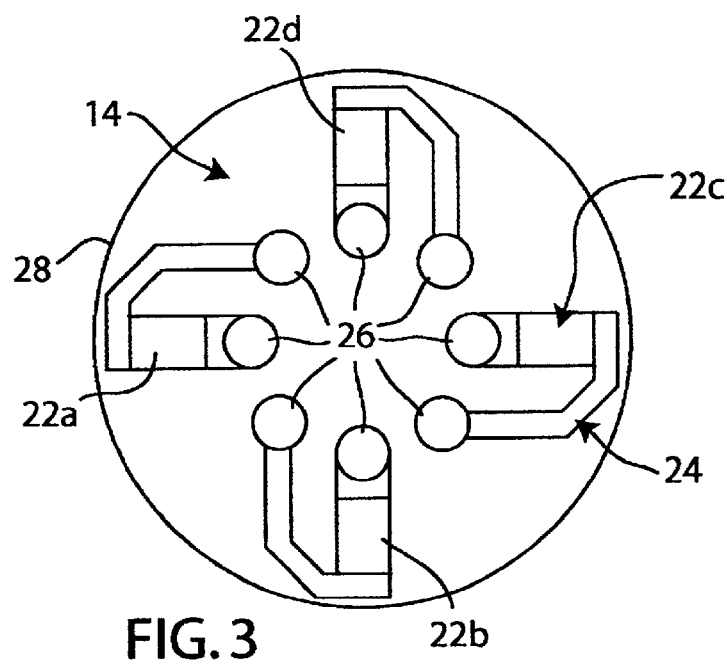
FIG. 3 shows the substrate of the present invention.

As described in FIG. 3, a ceramic substrate 14 is provided which is formed to mate with the flange 18 on the base 16. The substrate 14 is dimensionally smaller than the base 16. The substrate includes four strain sensitive resistors 22a,b,c,d on the side opposing the base 16. The strain sensitive resistors 22a,b,c,d are preferably thick film devices screen printed onto the ceramic substrate 14. The screening process is done using strain sensitive paints in a manner known to one skilled in the art. The resistors 22a,b,c,d are selected so that when the substrate 14 is placed under stress, the electrical resistance of the resistors 22a,b,c,d will vary in direct relation to the amount and relative direction of stress. Electrically conductive traces 24 are screened on the substrate 14 to provide an electrical interconnection of the resistors 22a,b,c,d to contact pads 26.

The strain sensitive resistors 22a,b,c,d and electrically conductive traces 24 are shown located on the same side as the contact pads 26. These components could, however, be located on the opposite side, facing the actuator with an electrical via provided to make electrical contact between the strain sensitive resistors 22a,b,c,d and the contact pads 26. As used herein, the spatial relationships between the strain sensitive resistors 22a,b,c,d, the outer edge 28 and the contact pads 26 are independent of the side on which they are located. Thus, describing the strain sensitive resistors 22a,b,c,d as being located between the outer edge 28 and the contact pads 26 allows the strain sensitive resistors to be on either side of the substrate 14.

The contact pads 26 are designed to allow an electrical connection with a printed circuit board using standard solder techniques. The contact pads 26 are located proximal or close to the center of substrate 14. This is done to focus the stress between the center of the substrate 14 and the contact point with the actuator or actuator 12 around the periphery of the substrate 14. The resistors 22a,b,c,d are located in this stress region. The outer edge 28 of the substrate 14 and the flange 18 of the base 16 are formed to mate in a snap-fit arrangement. Alternatively, the flange 18 could be attached to the outer edge 28 using some epoxy or other adhesive material.

The overlimit protectors 15 are provided on the actuator 12 to prevent the user from damaging the sensor by overstressing the pointing stick. As the actuator 12 is stressed by the user, the base 16 will deflect relative to the substrate 14. If the user continues to stress the actuator 12, the overlimit protectors 15 will contact the substrate 14, limiting any further travel of the actuator 12. In this way, additional stress placed on the actuator 12 will not be transferred to the substrate 14 at its periphery, but will instead be transferred through the overlimit protectors 15 to the substrate 14 closer to the center. This helps to prevent damage to the actuator 12 and substrate 14.

A support member 30 is provided beneath the substrate 14. The support member 30 is preferably a printed circuit board containing other electrical or electronic devices in addition to the pointing stick 10. The pointing stick 10 is attached to the support member 30 via conductive solder paste 32. The solder paste 32 also provides electrical interconnection between electrical traces on the support member and the contact pads 26 on the substrate 14.

The thermal coefficient of expansion for the support member 30 is different from that of the substrate 14. Thus, as the computer 7 heats up, the support member 30 and the substrate 14 will expand at different rates. The contact pads 26 on the substrate 14 are initially in alignment with the contact points (not shown) on the support member 30. As the two members expand at different rates, the relative contact points will shift slightly, generating stress on the solder joint. As the contact pads 26 are separated by greater distances, the total shift will correspondingly increase. Thus, by placing the contact pads 26 proximal to the center of the substrate 14, the total distance between these points is reduced and the shift caused by the varying coefficient of thermal expansion is minimized.

Another advantage to locating the contact pads 26 proximal to the center of the substrate 14 is a reduction in susceptibility to keyboard flexing. The pointing stick 10 is mounted adjacent to the keyboard 9. As keys are depressed, the support member 30 may be flexed slightly. This deflection can be sensed by the strain sensitive resistors 22a,b,c,d and will then be converted to an unwanted movement of the cursor 8 on the display device 11. By placing the contact pads 26 close together, these keyboard deflections are minimized reducing the risk of spurious cursor movement.

Figure 8:
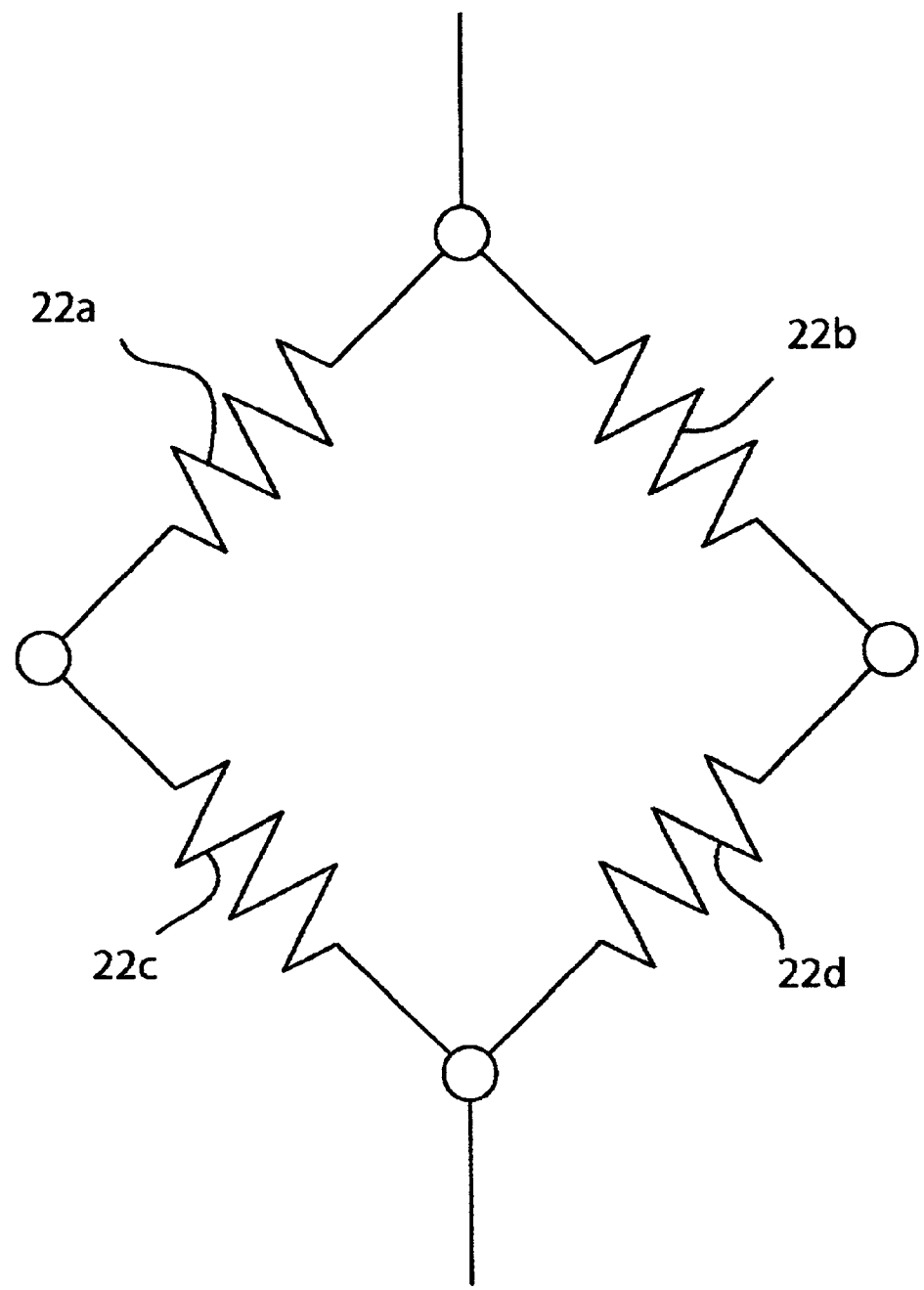
FIG. 8 shows the electrical schematic representing the preferred embodiments.

The electrical output from the strain sensitive resistors 22a,b,c,d is generally relatively low-level and is thus susceptible to electro-magnetic interference. In order to minimize the impact of such interference, it is common to provide signal conditioning circuitry that amplifies the output signal. The signal conditioning circuitry may also provide an analog to digital conversion in order to provide a digital signal indicative of the pointing stick 10 output. The signal conditioning circuitry may be included as an integrated circuit 34 located on a printed circuit board functioning as the support member 30. In practice, the four strain sensitive resistors 22a,b,c,d are connected to form a bridge circuit as shown in FIG. 8.

Figure 5:
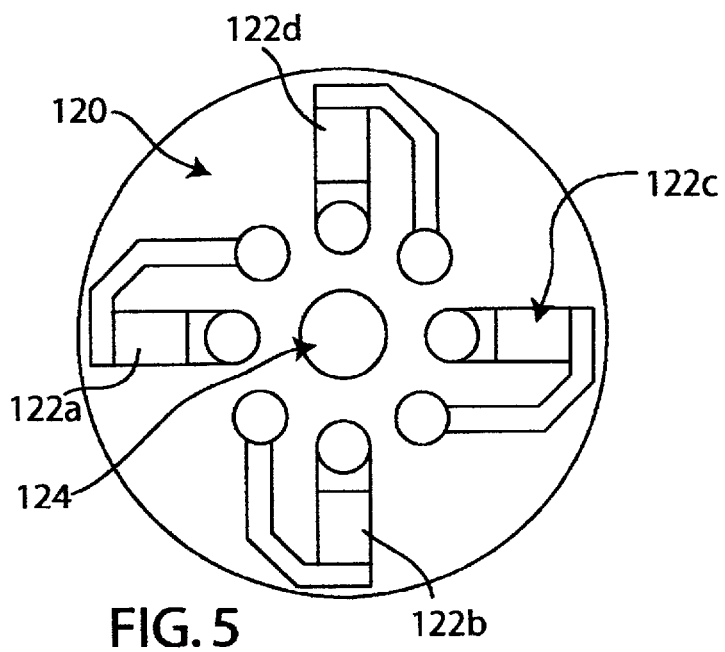
FIG. 5 shows the substrate of the alternative embodiment of FIG. 4.
Figure 4:
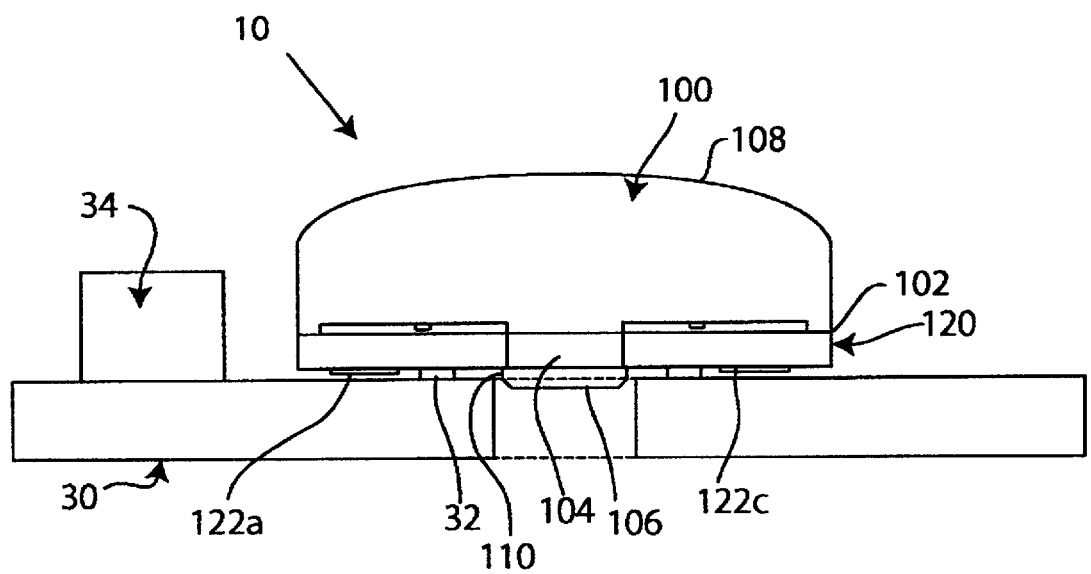
FIG. 4 shows an alternative embodiment of the present invention.

An alternative, even more compact design incorporating the present invention is shown in FIGS. 4–5. In this embodiment, a rubber actuator 100 is provided which includes a peripheral flange 102 and a center post 104. The end 106 of the post 104 extending furthest from the cap 108 includes an extension 110 that has a radius wider than that of the post 104. The substrate 120 includes strain sensitive resistors 122a,b,c,d configured similarly to those previously discussed. The substrate 120 is mounted to support member 30 as previously described herein. The substrate 120 additionally includes a receptacle 124 located in the center of the substrate 120. The receptacle 124 is formed to receive the post 104 in a slight interference fit. By pressing the post 104 into the receptacle 124, the extension 110 is compressed until it protrudes beyond the bottom of the receptacle 124. The extension 110 thus provides a secure mechanism to hold the actuator 100 to the substrate 120.

As the user applies stress to the actuator 100, the flange 102 correspondingly presses on the edge of the substrate 120. The strain sensitive resistors 122a,b,c,d are stressed by the resulting deflection in the substrate 120. As with the prior embodiment, this stress causes the resistance of the resistors 122a,b,c,d to vary which provides an electrical indication of the user's desire to move the cursor.

Figure 7:
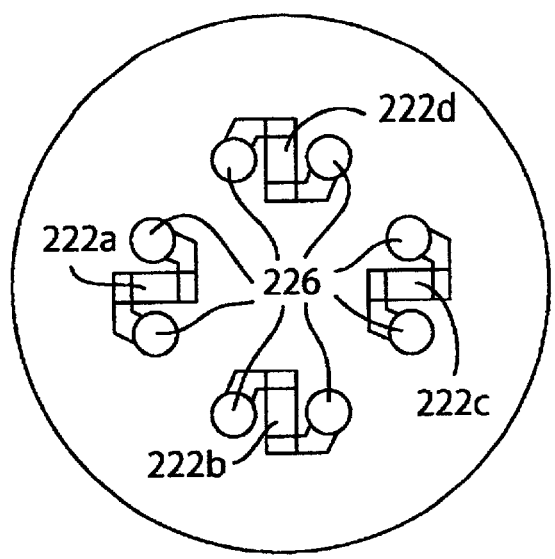
FIG. 7 shows the substrate of the second alternative embodiment of FIG. 6.
Figure 6:
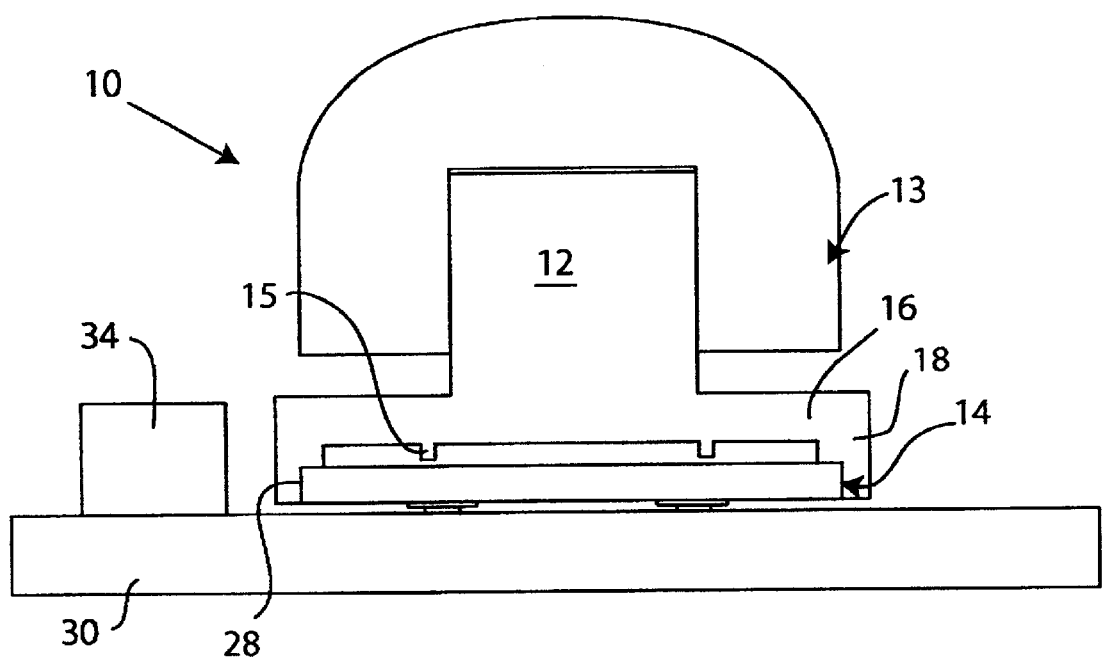
FIG. 6 shows a second alternative embodiment of the present invention.

A third alternative embodiment is shown in FIGS. 6–7. In this embodiment, strain sensitive resistors 222a,b,c,d are located between contact pads 226. In other respects this embodiment resembles that of FIGS. 2–3. The strain sensitive resistors 222a,b,c,d are placed between contact pads 226 because the region closest to the contact pads receives the maximum amount of stress. Thus, the strain sensitive resistors 222a,b,c,d will have an increased output with increased sensitivity due to this placement.

It should be apparent that the detailed description above is illustrative only and should not be taken as limiting the scope of the invention. Similarly, not all of the functions performed by the embodiment disclosed need be performed in any one mechanism or circuit. Accordingly, the invention should be understood to include all such modifications as come within the scope and spirit of the following claims and equivalents thereto.

I claim

1. A cursor control device comprising:

an actuator having a flange that extends around a periphery of the actuator at a first end, the flange defining a cavity;

a cap attached to a send end of the actuator;

a substrate having a top surface, a bottom surface, a center and an outer peripheral edge;

four strain sensitive resistors formed on the bottom surface of the substrate toward the outer peripheral edge, each of the resistors having a first end and a second end;

a plurality of conductive traces, the conductive traces connected to each first end of the resistors;

a plurality of contact pads attached to each second end of the resistors, the contact pads located toward the center of the substrate, the resistors connectable so as to form a wheatstone bridge;

the actuator mounted to the substrate, the actuator extending over the top surface of the substrate and the flange engaged with the outer peripheral edge, the flange supporting the actuator at the outer peripheral edge such that stress placed on the cap is transferred to the actuator and the substrate and places a corresponding strain on the resistors.

2. The cursor control device according to claim 1 wherein an overlimit protector is attached to the first end of the actuator, the overlimit protector extending from the actuator toward the substrate, the overlimit protector adapted to prevent excessive stress on the substrate.

3. The cursor control device according to claim 1 wherein the contact pads are soldered to a circuit board.

4. A cursor control device comprising:

an actuator having a flange that extends around a periphery of the actuator at a first end of the actuator, the actuator further having a center;

a post extending away from the center of the actuator, the post having an end with an extension;

a substrate having a top surface, a bottom surface, a center, an outer peripheral edge and a receptacle;

four strain sensitive resistors formed on the bottom surface of the substrate toward the outer peripheral edge, each of the resistors having a first end and a second end;

a plurality of conductive traces located on the bottom surface, each conductive trace having a third end and a fourth end, the third end of the conductive trace connected to the first end of the resistors;

a plurality of contact pads, one of the contact pads attached to each of the fourth ends of the conductive traces and one of the contact pads attached to each of the second ends of the resistors, the contact pads located toward the center of the substrate, the resistors connected so as to form a wheatstone bridge;

the actuator mounted to the substrate, the actuator extending over the top surface of the substrate and the flange engaged with the outer peripheral edge, the flange supporting the actuator at the outer peripheral edge, such that stress placed on the cap is transferred to the substrate and places a corresponding strain on the resistors;

the post mounted into the receptacle, the extension protruding from the post onto the bottom surface, the post and extension securing the actuator to the substrate.

5. The cursor control device according to claim 4 wherein an overlimit protector is attached to the first end of the actuator, the overlimit protector extending from the actuator toward the substrate, the overlimit protector adapted to prevent excessive stress on the substrate.

6. The cursor control device according to claim 4 wherein the contact pads are soldered to a circuit board.

7. The cursor control device according to claim 6 wherein the circuit board has an aperture, the post extending into the aperture.

8. A cursor control device comprising:

a planar substrate having a top surface, a bottom surface, a center and an outer peripheral edge;

four strain sensitive resistors located on the bottom surface of the substrate toward the outer peripheral edge;

a plurality of conductive traces located on the bottom surface of the substrate, each of the conductive traces having a first and end and a second end, the first end connected to one end of each of the resistors;

a plurality of contact pads located on the bottom surface of the substrate, the contact pads attached to the second end of the conductive traces and the other end of the resistors, the contact pads located toward the center of the substrate, the resistors adapted to be connected in a wheatstone bridge configuration;

an actuator having flange that extends around a periphery of the actuator at a first end, the flange defining a cavity, the actuator mounted over the top surface of the substrate, the flange engaged with outer peripheral edge, the flange supporting the actuator at the outer peripheral edge, such that stress placed on the actuator is transferred to the substrate and causes a change in the resistance of the strain sensitive resistors.

9. The cursor control device according to claim 8 wherein an overlimit protector is attached to the first end of the actuator and extends toward the top surface of the substrate.

* * * * *